United States Patent
Pope

(10) Patent No.: US 7,145,835 B2
(45) Date of Patent: Dec. 5, 2006

(54) PERSONAL SONAR SYSTEM

(76) Inventor: Matthew Pope, 2307 Echo Park Ave., Los Angeles, CA (US) 90026

( * ) Notice: Subject to any disclaimer, the term of this patent is extended or adjusted under 35 U.S.C. 154(b) by 0 days.

(21) Appl. No.: 11/053,789

(22) Filed: Feb. 9, 2005

(65) Prior Publication Data

US 2005/0265123 A1 Dec. 1, 2005

Related U.S. Application Data

(60) Provisional application No. 60/543,579, filed on Feb. 10, 2004.

(51) Int. Cl.
*H04B 11/00* (2006.01)
*G01S 15/96* (2006.01)
(52) U.S. Cl. ..................... 367/131; 367/910
(58) Field of Classification Search ............ 367/910, 367/131
See application file for complete search history.

(56) References Cited

U.S. PATENT DOCUMENTS

| | | | | |
|---|---|---|---|---|
| 3,800,273 A | * | 3/1974 | Rolle | 367/910 |
| 5,463,597 A | * | 10/1995 | Harlev | 367/910 |
| 6,226,227 B1 | * | 5/2001 | Lent et al. | 367/104 |
| 6,335,905 B1 | * | 1/2002 | Kabel | 367/98 |
| 6,678,209 B1 | * | 1/2004 | Peng et al. | 367/95 |
| 6,798,715 B1 | * | 9/2004 | Harmon et al. | 367/99 |
| 2005/0064774 A1 | * | 3/2005 | Grune et al. | 441/74 |

* cited by examiner

*Primary Examiner*—Ian J. Lobo
(74) *Attorney, Agent, or Firm*—Paul K. Tomita, Esq.; Dergosits & Noah LLP

(57) ABSTRACT

The sonar device includes a sonar transducer, a noise filter, a microprocessor and an output device. The system warns the user when a hazardous objects is detected or when signals from companions decrease. The portable sonar device can be built into various watersport devices including scuba diving equipment, surfboards and windsurfboards.

10 Claims, 3 Drawing Sheets

PERSONAL SONAR SYSTEM

This patent application claims priority to U.S. Patent Application No. 60/543,579 filed Feb. 10, 2004, which is hereby incorporated by reference.

BACKGROUND

Sonar (SOund NAvigation Ranging) technology is used to detect objects under the water. A sonar device emits acoustic pulses in water and receives an echo from any objects that the acoustic pulse reflects back from. The distance between the sonar device and the object can be determined by measuring the time between the pulse transmission and reflected pulse reception. Active sonar creates a pulse of sound, often called a "ping", and then listens for reflections of the pulse. To measure the distance to an object, one measures the time from emission of a pulse to reception. The acoustic pulse travels at the speed of sound underwater, thus the distance is determined by the (speed of sound)/(time between sending and receiving the pulse/2).

The pulse may be at constant frequency or a chirp of changing frequency. For a chirp, the receiver correlates the frequency of the reflections to the known chirp. The resultant processing gain allows the receiver to derive the same information as if a much shorter pulse of the same total energy were emitted.

SUMMARY OF THE INVENTION

The present invention is a personal sonar system that can be used in most water sport applications and comprises a sonar transducer, a processor and an output device. In a surfing embodiment, the sonar device is integrated into the user's surfboard. In a preferred embodiment, the sonar transducer is mounted at the back end of the board and emits a wide angle sonar signal which will detect large moving underwater animals including predatory fish. Electrical signals from the transducer are filtered to remove background noise which is caused by the movement of the surfboard due to ocean swells and stationary underwater objects on the sea floor. The electrical filter can be frequency based or may be a software algorithm running on a microprocessor. The algorithm may be a neural network or an adaptive system. The signal alerts the user when a large underwater animal is detected. The alert signal may be an optical light signal or an audio signal. The light and/or speaker may be mounted on the upper front surface of the surfboard which is easily noticeable to a surfer sitting on the rear of the board waiting for a wave to ride.

In another embodiment, the sonar unit may be mounted in a self contained housing for use by snorkelers and scuba divers. In underwater embodiments, the system not only detects large animals but also the separation from companions. The system detects the normal presence of companions based upon the reflected sonar signal or the detection of signals from the companions' sonar devices. When a companion signal grows faint, the system emits a warning signal to alert the user of separation. By knowing when a companion has separated from the group it becomes much easier for the user to start looking immediately for the companion. This can be particularly useful in low visibility situations such as night or cave diving.

In order to improve accuracy, the inventive system has an ambient calibration mode that allows the user to calibrate the system on site to the ambient underwater sounds. When a user enters the water, the area can be visually scanned for large animals. The close presence of large underwater animals is rare, thus the system user is normally safe. Every body of water has unique acoustic characteristics by tuning the unit to the specific location, the accuracy of the detection is improved. During any safe period, the unit can be set to calibration mode. The sonar unit transmits signals and detects the ambient reflected signals. This ambient signal is stored in the system's memory and used to calibrate the sonar system. This calibration mode allows the inventive sonar system to adapt to the location of the user and provides substantially enhanced detection accuracy. After calibration, the system is able to more easily detect unusual objects in the vicinity such as sharks.

The inventive unit can also be used to detect the presence of companions who need to stay in the proximity of the user. This function is important to avoid separation or be notified of separation from a group. The system may also have a companion calibration mode that allow the user to calibrate the sonar unit to detect companions on site. The companion detection mode is similar to the calibration mode. When the user is in the water, the user can actuate the companion calibration mode. The system detects the normal reflected signals produced by all companions or signals emitted by each companion and learns to recognize the companion signals. The companion system detects when any companion signal gets faint and warns the user of a companion's separation from the group while in the water.

DETAILED DESCRIPTION

Figure 1:
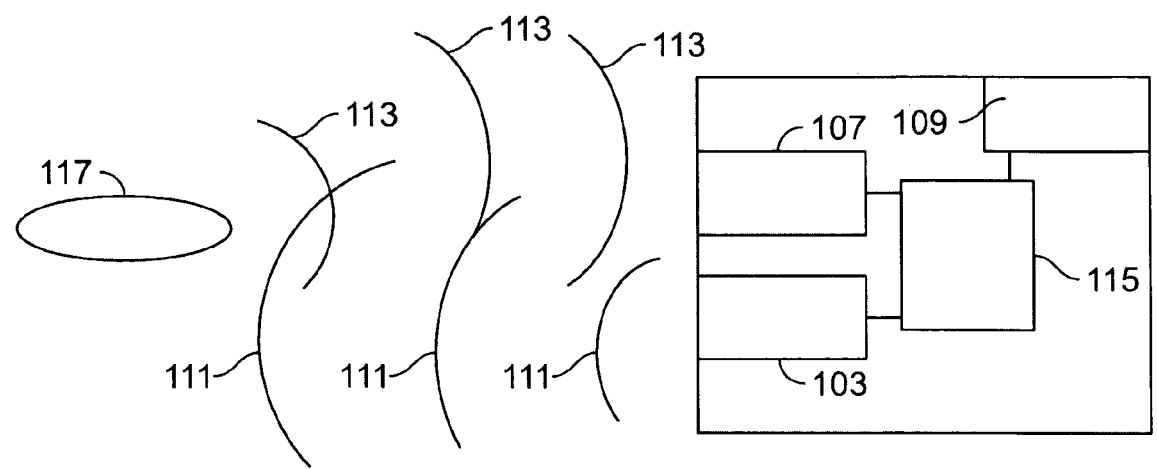
FIG. 1 is an illustration of the basic components of the inventive sonar device.

The present invention is a waterproof sonar device for use while surfing, scuba diving or other water sports. The inventive sonar device is used to locate sharks and other large animals. With reference to FIG. 1, the basic components of the sonar device include a transmitter 103, a transducer 105, a receiver 107, a display/user interface 109 and microprocessor 115. The microprocessor 115 instructs the transmitter 103 to emit sound waves 111 that are sent through the water 113. When the sound wave 111 strikes an object 117, it rebounds and returns to the transducer 105, after which it is converted back to an electrical signal that is amplified by the receiver 107 and the detected signals are processed by the microprocessor 115. The display/user interface 109 keeps the user apprised of the current operating conditions and warns the user of large objects in the area as well as the separation of divers.

The distance to an object can be determined based upon the time it takes for the signal to travel to an object and to return to the source. Since the speed of sound in water is relatively constant at approximately 4,800 feet per second, there is a direct relationship between time and distance. This process is repeated many times per second. In an embodiment, the microprocessor may include electronic memory such as a flash memory card or dynamic random access memory (RAM). These components are powered by electrical power which is normally supplied through a rechargeable battery. In an alternative embodiment, solar cells may be used as the primary power source or as a means of recharging the battery. The battery may also have a water proof connector which allows the batter to be recharged through household electrical power when the device is not in use. The battery may also be magnetically coupled to the recharger so that a direct electrical contact is not required. The battery may also be attached to the weight belt. Because the batteries are heavy, they can replace many of the lead weight typically used in a weight belt for neutral buoyancy.

In an embodiment, the present fish detection invention uses a portable sonar (an acronym for "SOund, NAvigation and Ranging") device to detect objects such as large fish or sharks in proximity to the user. The devices are suitable for the sonar device include, surfboards, scuba equipment, windsurfers, boats and handheld underwater devices. The invention allows the individual to detect or be alerted to the presence of a large fish so that evasive action can be taken. By detecting the presence of sharks, severe personal injury may be avoided. Sonar transducers come in many forms and are mounted on a surface that is submerged in the water. Each transducer is rated by the degree of cone angle. In general, a wide cone angle gives better results in shallow to medium depths while the narrow cone angle penetrates better to deeper depths but doesn't show as many fish or as much structure due to its narrow beam. Thus, for surfboards which are used primarily in shallow water a wide angle transducer may be more suitable than a narrow beam transducer. However in an embodiment, the device may have both narrow and wide angle transducers or more that the user can switch between or operate simultaneously. A single beam may cover a 16–24 degree range. A concentric dual beam system uses a first narrow center beam can be used within a second beam of 53 degrees that surrounds the first beam expanding the coverage. A three beam system uses three sonar beams to form a 90 degree detection range. The transducer may even be configured in an array with columns of multiple transducers.

The transducers may be configured to the behavior patterns of the fish to be detected. For example, sharks such as great whites frequently swim below the fish that are at the surface of the water that they are about to eat. They then swim upward when attacking. This provides good contrast of light around the target for the shark which has poor eyesight. Thus, if the invention is to be used to detect sharks in an application such as a surfboard, the transducers should be facing an area directly below the user.

In an embodiment, the sonar unit components include a high-power transmitter, an efficient transducer, a sensitive receiver and a high resolution/contrast display. The high transmitter power results in a strong signal returned to the unit. This is important in deep or poor murky water conditions. Additionally, the increased power allows the detection of more distinct object detail. The sonar units used and the housing (type and material) can determine which type of transducers are used. The transducer must be submerged in order to function. This is most likely from the transom area of the boat or the rear areas or fins of a surfboard or windsurfboard. The receiver dampens extremely strong signals and amplifies small signals in order to get an effective readout. It must also have the capability to separate small targets that are close together into distinct, separate impulses for the display as well as not interpreting non-mobile objects as fish. The transducers can also be sequentially triggered to conserve energy and scan a wide area around the user.

The sonar transducer draws electrical power from a battery or solar cell and produces signals that are directed towards the area of interest. These signals are reflected by the objects in the path of the signals. The sonar transducer also receives the reflected signals as well as other signals in the target frequency range. The transducer converts the acoustic signals into electrical signals that are forwarded to a signal processor. The signal processor filters the transducer signals so that signals from target objects are detected while the ambient non-target objects do not produce false detection readings. This filtering device may be: frequency/amplitude based, an adaptive algorithm, a adaptive neural network which analyzes a number of input signals or any other filter that can remove ambient signals. In a simple frequency based filter mechanism, the system removes high frequency signals from small fish and high amplitude signals from fixed large objects such as the ocean floor while in low depth waters. An adaptive filter detects changes in the input signals and adapts to these changes. By adapting to changes in ambient sonar signals, the inventive system will remain accurate as the diver travels from shallow to deep water to wreckage areas. In the neural network embodiment, the system may utilize additional input information such as temperature, depth, GPS location, etc and use this information in addition to the sonar signals to more accurately filter the transducer signals. By filtering out these ambient and benign signals, the system can leave a specific frequency range open to detect potentially threatening fish or moving objects.

In another embodiment, the system uses a broadband sonar transmission. Broadband echoes contain more information because they encompass frequencies that provide greater backscatter within one fish species relative to others. A broadband sonar transceiver generates analog echoes, amplifies the echoes, tunes the echoes for the frequency response of the transducer, and transmits the resulting echo from the transducer. Each "ping" represents 100,000 data points. The system typically sends one ping per second. The transducer collects the analog echo returns, applies amplification with adjustable gain to the echoes, and bandpass filters the echoes. The transducer must pass the echoes to an A/D converter capable of sampling at thousands samples per second to satisfy the sampling criteria and to achieve sufficient amplitude range and resolution.

For these broadband sonar signals, a digital processor filters the broadband echoes to produce frequency spectra. Spectral processing provides a representation of fish not available to existing fish finding sonar systems. Prior art sonar fish finding devices use time-domain processing that counts and integrates echoes. Using spectral decomposition, it is possible to determine which frequencies are most strongly reflected by the fish targets. The spectral information is presented to a neural network classifier which is used to identify specific objects. In the sonar sense, different size or species fish reflect a broadband illumination at specific frequencies. Further sonar data has been collected for various types of sea creatures. By using the proper frequency and identifying the reflected signal pattern, the inventive sonar device can be tuned to detect the bladder of specific types of fish. Broadband sonar techniques are able to identify frequency-dependent fish bladder resonance for several species of fish. This can be particularly useful for identifying hazardous fish such as great white sharks and filtering out all other reflected signals.

The signal signatures of fish are created and stored as fuzzy neural network coefficients in a database. These fuzzy neural network coefficients may include: sharks, eels, sea snakes, whales, sea elephants, motor boats, jet skis, submarines, etc. The signals detected by the sonar transducer are compared to the database of stored signals by the processing system. This comparison process includes data analysis steps, including performing feature extraction to measure specific characteristics of the echo. The system produces digital echoes to determine whether the sonar pulse has bounced off an object and returned. The system also uses feature information in the fuzzy neural network to determine the type object. In the object identification embodiment, the system may include: a data acquisition processor (DAP), an analog-to-digital (A/D) converter with an onboard microprocessor, that permits the PC-based system to handle the massive amount of data generated by sonar transmissions. If the system detects a matching signal, a warning signal is sent to an output device.

The digital processor filters may also include a calibration mode which allows the system to detect the ambient noise from the user's location and more accurately determine true hazardous objects. In order to use the calibration mode, the user must first determine that the area of water is free of hazardous objects. This is normally done by visually checking the surrounding area. The system then transmits sonar test signals and records the reflected signals. These reflected signals represent the ambient noise for that area. After calibration, the system filters the signals by removing the ambient noise. This allows the inventive sonar system to adapt to the ambient conditions of any area of water and provide more accurate detection results.

The output device can be any mechanism that will alerts the user. Output devices include: a visual display, an acoustic device, a vibration device or any other device which emits a signal that the user can detect. The visual display may be a blinking high visibility light, an LCD screen that shows proximity and movement of the object relative to the user or any other optical signal that can be detected by the user. An acoustic signal may also warn the user of a close proximity object. The acoustic speaker may be underwater or a normal air type speaker depending upon the application. The signal must be in the frequency range of the human ear. The signal can be a series of pulses or any other type of alarm sound. The vibration output requires a motor that causes the device to vibrate when actuated. The user senses the vibration when the device is in direct or indirect contact with the user.

Power to the inventive system can be provided by rechargeable batteries and/or solar cells depending upon the application. In a surfboard embodiment, the board is exposed to sun and solar cells can be used. Similarly, solar cells may also be used by snorklers who are in shallow waters in sunny conditions. The solar cells may be used to recharge the batteries so that the device is still active when the solar cell is in a shaded area. Solar cells may not be useful for many scuba divers because the water depth reduces the light rays that can reach the divers. Batteries are can be very heavy, however divers typically carry weight belts. Thus, the weight of the batteries can be used instead of weights on the weight belt to help submerge the diver.

In another embodiment, the system can also be used to detect the presence of companions. This feature is particularly useful when it is desirable to keep a group of people together. The inventive system warns the user when a companion has strayed from the group. The feature detects the presence of companion by their reflected sonar signal or by a signal emitted by each of the companions. The system can be set to calibration mode where the system emits a test signal and records the reflected signals from the companions or the system records sonar signals emitted by the companions. After calibration, the user and companions can travel underwater with the system monitoring the presence of the companions by their sonar signals. If the system does not detect a strong companion signal, it alerts the user. The user can then stop and look for the companion to keep the group together.

Figure 2:
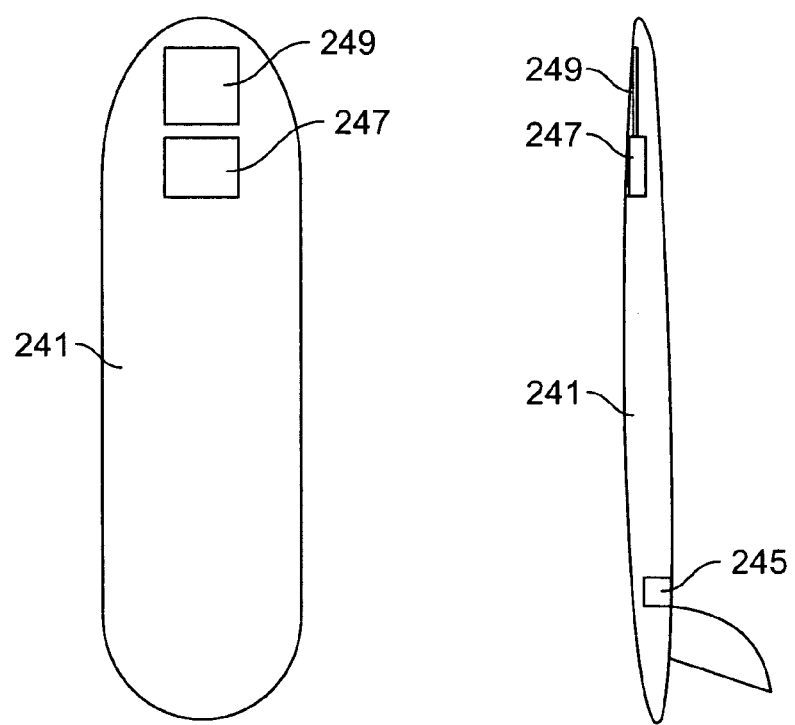
FIG. 2 is an illustration of a scuba diver using the inventive handheld sonar device.

In different embodiments, the inventive system can be integrated into various water sport devices. For example with reference to FIG. 2, the system can be used with surfboards 241 to warn the surfer of sharks in the area. The sonar device is self contained and would be installed in a hole or recess formed in the surfboard 241. In this embodiment, the sonar transducer 245 is integrated into the tail section on the bottom of the board 241 with sensor aimed straight down. The warning output device 247 is mounted on the top front of the board 241 where the user can see and hear the warnings while sitting or laying on the board 241. The battery may be a solar cell 249 on the top of the board 241 and/or a battery built into the board 241.

Figure 3:
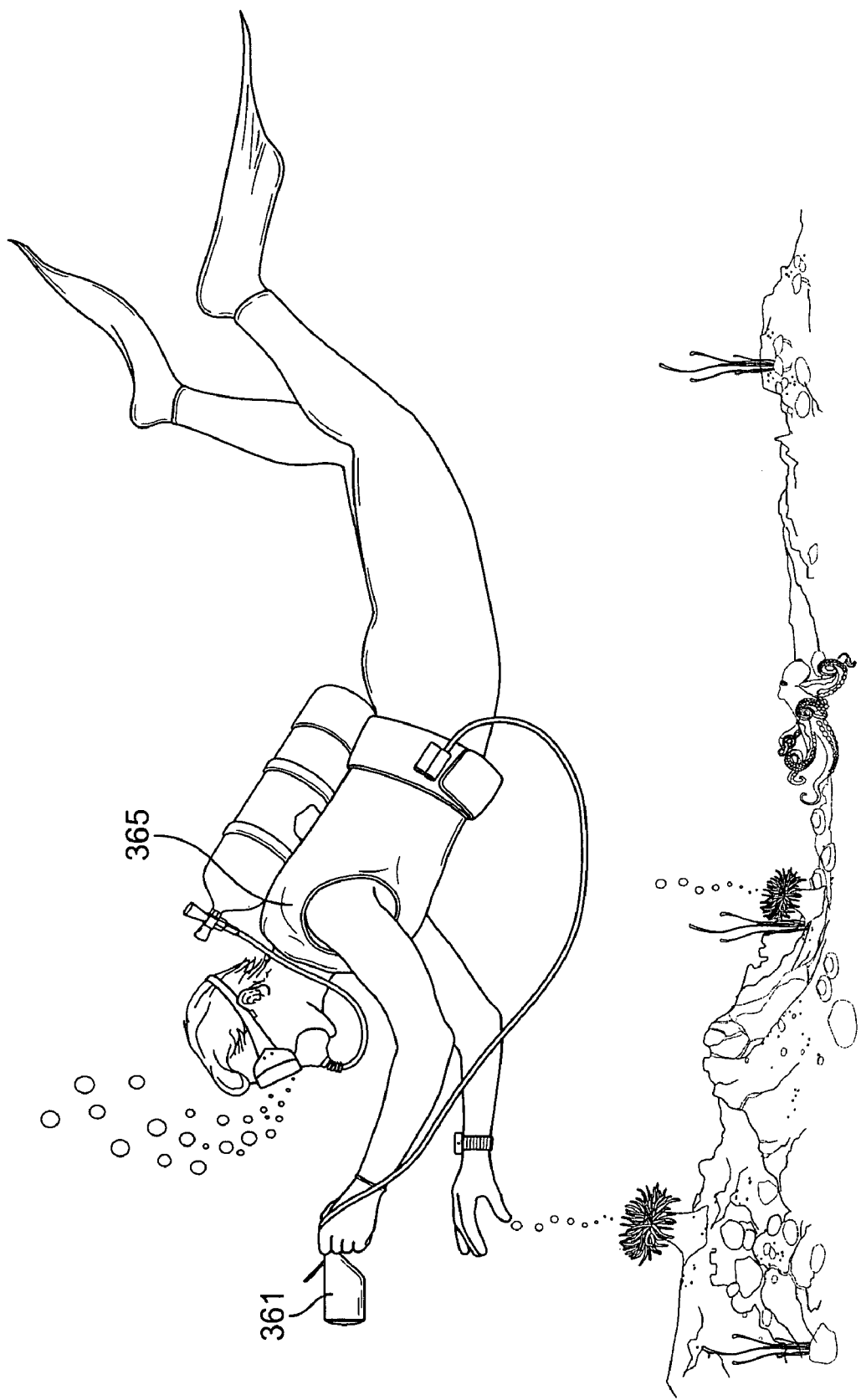
FIG. 3 is a top view of the handheld sonar device.
Figure 5:
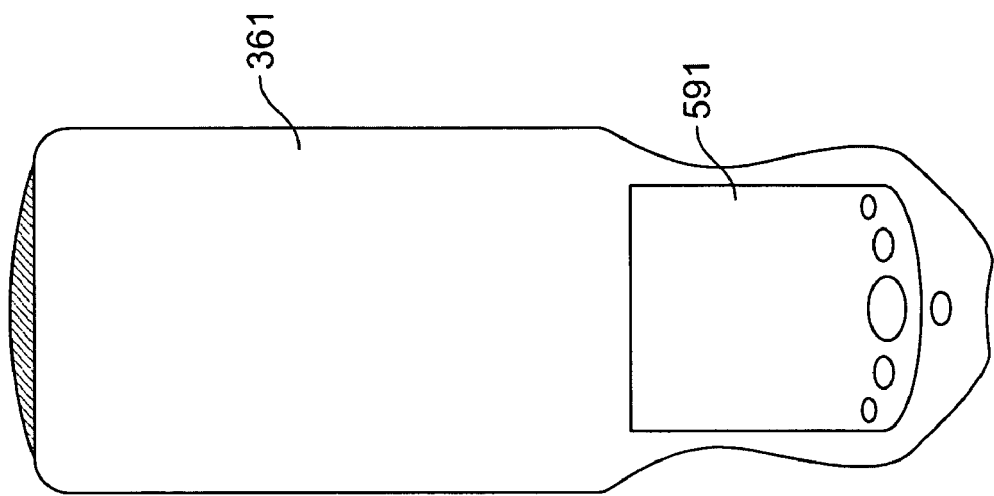
FIG. 5 is an illustration of a surfboard that incorporates the inventive sonar device.
Figure 4:
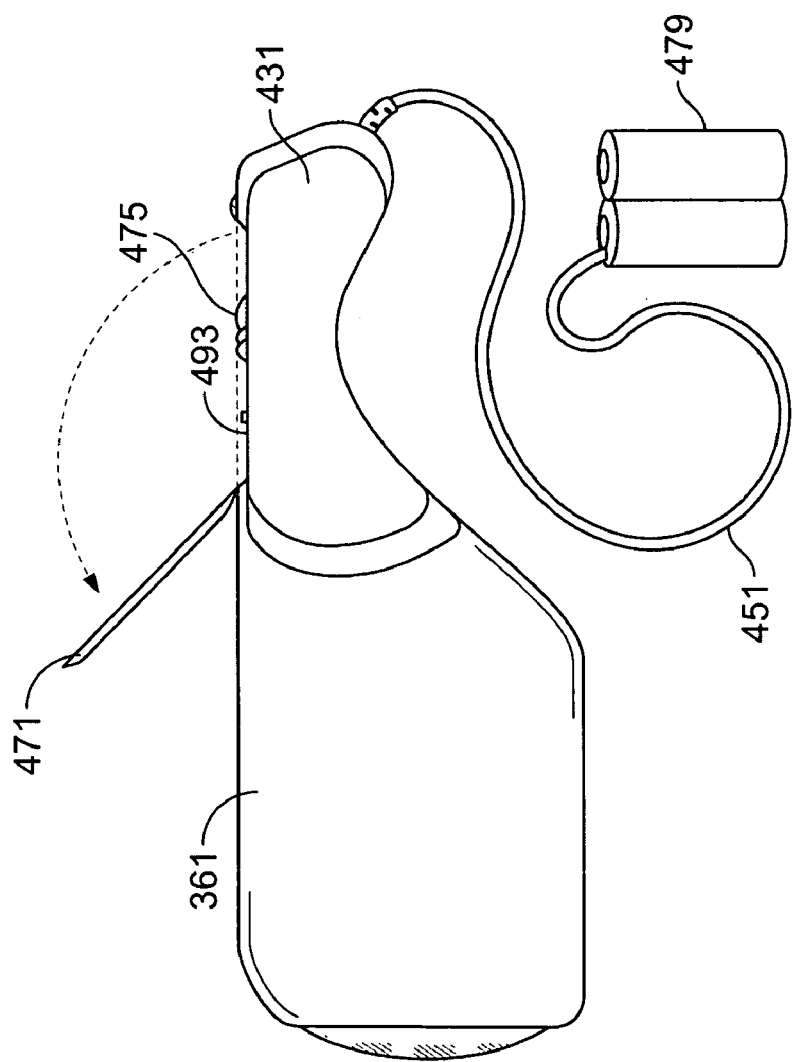
FIG. 4 is a side view of the handheld sonar device.

With reference to FIG. 3, the inventive device may be a hand held device 361 contained in a waterproof and pressure proof housing. In this embodiment, the device 361 can be held by a diver 365 to locate sharks and other large animals. With reference to FIG. 4, the device 361 may have a high resolution LCD or a fluorescent cold cathode backlit screen 471 that would show proximity of animals to subject. The device 361 also has a hand grip 431, a control panel 493 and control buttons 475 that are part of the user interface and allow the user to control the operation of the device 361. For example, a control button 475 may be used as a gain adjustment to filter out "false" readings. There would be an option to use a backlit screen 471 for use in limited light situations such as night dives. Power would be supplied by rechargeable DC batteries 479 that are carried in the weight belt 477 or disposable batteries. The battery pack 479 may be a separate unit connected to the system 361 with a waterproof cable 451 or integrated into the system. This device 361 would be directional and would not be passively active. As optional features, a GPS device and/or a radio may also be integrated into the device 361. With reference to FIG. 4, the system 361 may have a cover 591 that flips up to allow the user access to the screen 471, control panel 493 and control buttons 475 in the open position and protect these components in the closed position.

In an embodiment, the system may also be modular in design. The inventive sonar unit will send and receive signals and display the results on a variety of output devices that are connected by a wires or wireless communications. The output may be a display (color or black and white) having a high resolution and good contrast to show all the detail crisply and clearly. The sonar scan may be displayed on a screen such as a liquid crystal display (LCD). Increased resolution allows small targets like fish and other fine detail to be accurately shown on the display. The screen may illustrate all objects that are in the presence of the transducer's cone angle. The user can look at the screen and determine where the objects (fish) are in relation to the individual as well as the size of the objects.

Alternatively, the display may be a simple light such as a flashing light emitting diode (LED) which produces instantaneous blips of light or an audible signal from a speaker or ear phone which warns the user of a potential dangerous presence. In these embodiments, the sonar device will include a filter which will only transmit a warning signal if the reflected signal produced by the detected object is sufficiently large to be a concern to the user. In this embodiment, the signal reflected signal must be strong enough to represent a large fish that can produce bodily harm. The filter is required because the notification of the presence of any small fish would only be a nuisance to the user. In an embodiment, this filtering mechanism can be adjusted so that warning signal can be tuned to a specific size of fish depending upon the application. For example, windsurfers and surfers are only concerned about large fish but scuba divers may be very interested in detecting specific types of small fish.

In yet another embodiment, the system may be configured to emit a shark repellant solution or actuate an electronic shark repellant electrical field when a shark is detected in the area. The shark repellant solution may be housed in a container which has an electronically controlled valve which allows the repellant to be released into the water. When a shark is detected, the microprocessor may actuate the valve to release the repellant. The container may be pressurized or have a supplemental gas pressure chamber so that when the valve is actuated, the repellant is forced into the surrounding waters immediately.

In order to be easily handled underwater the portable sonar device should have a buoyancy that is similar to that of the surrounding water. By matching the density of the portable sonar to that of the water, the device will not rise or fall. The density of water is 1,000 Kilograms per cubic meter and the density of salt water is 1,027 kilograms per cubic meter. In order to produce a device that has similar buoyancy the inventive portable sonar device should have a weight to volume ratio that is about 1,000 kg/cubic meter. In order to avoid loosing the device if it is dropped, the buoyancy should be slightly less than 1,027 kilograms per cubic meter so that the device will float in pure water.

In yet another embodiment, a plurality of the inventive shark detection device can be set up in fixed positions to surround a specific area of water, for example a swimming beach area. When a shark is detected, the warning signals are transmitted to a central receiver which emits a warning signal to alert the people in the area that a shark has been detected. The warning signal can be an audible or visual signal. Communications between the detectors and the receiver can be through a wire, optical fiber, wireless communication or any other suitable means of communications. Because sea water strongly absorbs electromagnetic radio wave communications with submerged detectors are limited to just a few hertz. Alternatively, the detectors may float at the surface with solar panels and radio antenna exposed to the air and the sonar transmitter and receiver submerged below the surface of the water. These components may be integrated into a single unit or configured in separate units. With the antenna exposed, the can device can emit normal radio frequency signals. By tuning the detection to specific types of hazardous sharks, the public beaches can be made safer without resorting to nets which can trap sea life.

While the invention has been shown or described in only some of its forms, it should be apparent to those skilled in the art that it is not so limited, but is susceptible to various changes without departing from the scope of the invention. For example, the dampening materials may be formed from a thin film, sheet, molded or a combination thereof, and may be placed at a variety of interfaces to further reduce vibration and shock.

What is claimed is:

1. A portable sonar device having:
   a waterproof housing;
   a transmitter that emits sonar signals;
   a receiver that receives sonar signals and emits electrical signals;
   a memory that stores ambient noise for a body of water;
   a database of signals representing a plurality of hazardous fish;
   an electronic filter that removes ambient noise from the electrical signals;
   a microprocessor that interprets filtered electrical signals and compares the filtered electrical signals to the database of signals representing the plurality of hazardous fish; and
   an output device that is actuated when the filtered electrical signal corresponds to the signal representing the hazardous fish.

2. The portable sonar device of claim 1, wherein the ambient noise for a body of water stored in memory is replaced with a second ambient noise for a second body of water.

3. The portable sonar device of claim 1 wherein the database of signals includes a companion diver signal and the output device that is actuated by the microprocessor when an electrical signal from the sonar receiver corresponding to the companion signal stored in the database is not detected.

4. The portable sonar device of claim 1 wherein the output device that is actuated by the microprocessor when a companion signal strength decreases.

5. The portable sonar device of claim 1 wherein the electronic filter includes an ambient signal which is recorded by the user.

6. The portable sonar device of claim 1 wherein the electronic filter includes a computer program that records an ambient signal while the portable sonar device is in a body of water.

7. The portable sonar device of claim 1 wherein the waterproof housing is attached to a surfboard.

8. The portable sonar device of claim 1 wherein the waterproof housing includes a handle.

9. The portable sonar device of claim 1 further comprising:
   a solar cell or a rechargeable battery.

10. The portable sonar device of claim 1 further comprising:
    a user interface.

* * * * *